Dec. 26, 1967  K. Q. KONDOLF  3,359,688

WINDOW GLASS ENGAGING DEVICE

Filed June 11, 1965

INVENTOR.
KARL Q. KONDOLF

BY

Cumpston & Shaw

ATTORNEYS

United States Patent Office 3,359,688
Patented Dec. 26, 1967

3,359,688
WINDOW GLASS ENGAGING DEVICE
Karl Q. Kondolf, Penfield, N.Y., assignor to The Schlegel Manufacturing Company, Rochester, N.Y., a corporation of New York
Filed June 11, 1965, Ser. No. 463,218
4 Claims. (Cl. 49—490)

ABSTRACT OF THE DISCLOSURE

A polypropylene backed pile strip is mounted for free resilient movement adjacent a movable window glass and curved to dispose the pile convexly in engagement with the glass. One edge of the strip is secured in place and the other edge is free for movement and close to a fixed backing to brace the strip against deforming forces from the glass. The strip can be made U-shaped with one leg secured in place and the other leg bearing pile. Also, a fin can be added on the weather side of the pile.

---

This invention relates to an improved window glass engaging device, and more particularly, to an improved device for disposing a pile row resiliently in engagement with a window glass.

This invention is particularly adapted for application to movable window glass such as in motor vehicles, boats and similar or analogous situations. In such arts, it is known to dispose a pile row in engagement with a window glass for guiding, supporting, and sealing purposes, but such prior art devices have suffered several disadvantages, including expense of manufacture, difficulty and expense of installation, improper fitting, lack of adjustability, lack of resiliency, and rapid wear diminishing the sealing and supporting qualities of the strip and occasionally damaging the window glass.

It is an object of this invention to make an improved glass engaging strip that is economical to manufacture and install, that is resiliently urged against the glass to make a proper seal and to be automatically adjustable, and that is effective and long lived.

Another object of the invention is to make a glass engaging strip that can be deformed from its normal position by a molding or lifter bar fixed to a window glass, and that will resiliently return from any such deformed position into normal engagement with the glass.

Another object of the invention is to make a glass engaging strip that can be conveniently secured in place by mechanical fasteners which cannot engage the glass even after the pile and its backing strip become worn.

Another object of the invention is to make an improved seal between a structural body such as a motor vehicle body and a movable window glass.

Other objects of the invention will be apparent hereinafter from the specification and from the recital of the appended claims. To these and other ends, the invention resides in certain improvements, all as will be hereinafter more fully described, the novel features being pointed out in the claims at the end of this specification.

Figure 1:
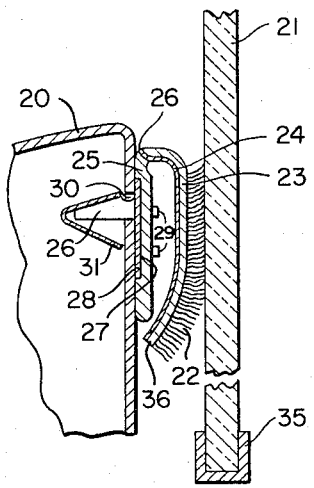
Figure 2:
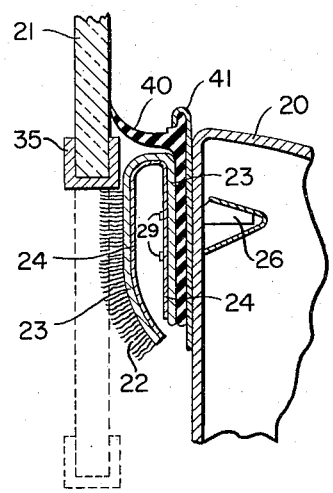
Figure 7:
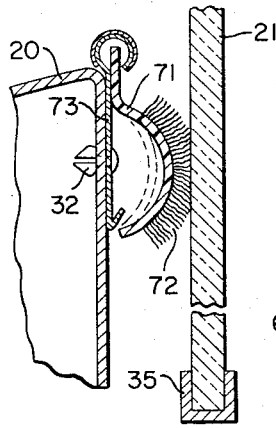

Each of the figures of the drawing shows a cross section view of one of various embodiments of the window glass engaging device according to the invention. FIGS. 1, 2, and 7 shows respective embodiments of the invention in engagement with a window glass.

Generally, the inventive glass engaging strip is spring-like and formed of a strip of material that is provided with pile extending from the face thereof. A lamina of resilient, synthetic thermoplastic resin of suitable type and thickness is secured to the back of the strip to make the strip self-supporting and rigid enough to maintain a desired normal position, and yet resilient enough to allow movement from and return to such normal position during engagement of the pile with a window glass, window glass molding, window glass lifter bar, etc. Several means are provided within the spirit of the invention for securing such a resilient pile-bearing strip in place with the pile engaging a window glass, and within the spirit of the invention, a fin strip can be arranged adjacent the pile for improving the seal between the window glass and structure on which the device is mounted.

Referring to FIGS. 1 and 2, the inventive window-glass engaging device is shown secured to a structure 20 such as the body of a motor vehicle to engage against a window glass 21 and provide a seal between glass 21 and structure 20. The device of FIG. 1 is adapted for engaging window glass 21 on the inside thereof, and the embodiment of FIG. 2 is adapted for engaging glass 21 on the outside or weather side thereof.

Pile 22 is secured to backing strip 23 and engages glass 21 to provide the desired support and seal between the glass and body 20. Pile 22 can be formed on or secured to backing strip 23 by any convenient method such as flocking, stitching, tufting, fusion, or adhesive, but preferably, backing strip 23 is formed of woven fabric material, and pile 22 is woven directly into fabric 23 in a single weaving operation to provide backing strip 23 with integral pile 22. Pile 22 and the strands or filaments of woven strip 23 are preferably each formed of polypropylene which is preferred for its economy, long flex life, resiliency, and ability to withstand moisture, among other characteristics.

A plastic backing or lamina 24, preferably including polypropylene, is secured to the back of strip 23 preferably after strip 23 is provided with pile. A preferred material for plastic lamina 24 is an alloy or combination of polyethylene and polypropylene, but other plastics and polymers are suitable for specific applications. The desired characteristics of plastic lamina 24 are that it make the strip 23 sufficiently rigid to be self-supporting in holding pile 22 in engagement with glass 21, and resilient enough to urge pile 22 into engagement with glass 21 even after having been deformed from its normal position. Backing strip 23 is thus spring-like relative to structure 20 and is biased away from structure 20 and toward glass 21. Such resiliency eliminates the need for any padding behind backing strip 23 or any other support device for pressing pile 22 into sealing engagement with glass 21.

In the preferred form of the invention, the material of the woven fabric backing strip 23 (preferably polypropylene) and the material of the plastic backing 24 (preferably including polypropylene) are compatible with each other and fusible together to form an integral element. The plastic backing 24 can then be either fused to or coated on the back of fabric strip 23, and, in addition to being applied in a fluid form, backing lamina 24 can be either a self-supporting, extruded plastic member or a relatively limp and flexible sheet-like plastic layer. Whether backing 24 is applied to strip 23 as a liquid or as a sheet or as a self-supporting member fused together with strip 23, it is preferred that the resultant unitary, spring-like element have the preferred resilience and self-supporting characteristics to maintain pile 22 in engagement with a window glass.

In the embodiment of FIG. 1, fabric strip 23, with its backing coating 24, is secured to and supported by support element 25 which is preferably formed of extruded plastic material. Any of a variety of plastics are suitable for forming member 25 which can be economically extruded and secured to fabric strip 23 so as to require a minimum amount of fabric 23. It is preferred that support element 25 be formed of a material which can be fused to the plastic backing 24 of strip 23 such as at the illustrated line of fusion 26.

Supporting strip 25 is secured to structure 20 by any convenient means including fusing, adhering, and mechanical fastening. In the embodiment of FIG. 1, a clip or fastener 26, known per se, is secured to support element 25 and in turn, fastens support element 25 to structure 20. A shallow slot 27 is preferably formed in support element 25 so that the base plate 28 of clip 26 can be counter-sunk to at least flush with the structure-engaging surface of element 25 so that element 25 can be drawn into close engament with structure 20. Support element 25 is held to clip 26 by clinched prongs 29 which are bent down against the surface of support element 25 opposite slot 27. To secure the inventive window engaging device in place, it is merely necesary to force the head of clip 26 through aperture 30 in structure 20, and resilient arm 31 of clip 26 then prevents withdrawal of clip 26 through aperture 30. Backing strip 23 and pile 22 are then secured in proper position adjacent glass 21, and pile 22 is disposed in resilient engagement with glass 21.

Clip 26 or some other mechanical fastening means is preferred for securing other embodiments of the inventive window glass engaging device in place. A different form of mechanical fastener 32 is illustrated in FIG. 7, and a variety of mechanical fasteners are suitable for use with the invention. Preferably, any such mechanical fastener is arranged similarly to the clip 26 so as not to extend through backing strip 23 on which pile 22 is secured. This prevents any portion of a fastening means from extending into the pile area and near glass 21 where it might scratch glass 21 when pile 22 becomes worn or when the glass and the engaging strip are urged together with too much force. Glass 21 is thus protected from any damage by a fastening means when the inventive glass engaging device is used.

A lifter channel or bar 35 is shown secured to window glass 21 in FIGS. 1, 2, and 7, and such lifter bar is a well-known device for engaging the bottom of a window glass to transmit lifting and lowering forces to the glass. Also, it is well known, especially in convertible or hard-top automobiles, for a window glass to have a molding in the form of a generally U-shaped metallic edge-trimming strip similar to the lifter channel 35. Such mouldings and lifter bars have tended to tear, crush, deform, and otherwies damage pile and pile backing strips in prior art window engaging devices.

The inventive window glass engaging device, because of its resilient, spring-like backing strip 23, can be deflected from its normal position by engagement with lifter channel 35 and can allow the passage of channel 35 over pile 22 and strip 23 without damage as best illustrated in FIG. 2. Because of the natural resiliency of strip 23, it automatically springs back into engagement with glass 21 after being bent aside by a molding or lifter bar 35. The flex life of the preferred polypropylene material for the inventive strip is such that the inventive window engaging device can be deformed many times without fatigue or breakdown. In fact, age and wear tend to make strip 23 flatten or straighten, which results in strip 23 pressing toward glass 21 even after years of use.

Previously, it was necessary to make motor vehicle windows high enough vertically so that lifter bar 35 did not rise into engagement with the window engaging strip disposed along the lower edge of the window frame, because such engagement would have damaged the strip. However, the inventive window engaging device allows lifter channel 35 to pass over pile 22 and backing strip 23 without damage, so that motor vehicle windows can be made somewhat shorter from top to bottom and can be normally fully closed with lifter bar 35 elevated to the position illustrated in FIG. 2. The saving of even a fraction of an inch off each window of a motor vehicle by use of the inventive window engaging device amounts to a considerable dollar value.

The resiliency of strip 23 can be adjusted somewhat by its length. Referring to FIG. 1, if strip 23 is pressed toward structure 20, its end 36 soon engages structure 20, and the resistance of strip 23 to further deflection in the direction of structure 20 is increased. If strip 23 is made shorter so as to space end 36 farther from structure 20, such increased resistance to deflection occurs at a more deformed position, and if strip 23 is made straight, or widely separated from structure 20, no such increased resistance to deflection will occur in normal use.

In the embodiment illustrated in FIG. 2, a window engaging fin strip 40 is included with the pile 22 and backing strip 23. Fin 40 is preferably formed of resilient, flexible material such as plastic or rubber, and engages glass 21 to provide a more effective seal therewith, and to deflect water running down window 21 to the outside of structure 20. As illustrated, lifter channel 35 can rise into engagement with fin 40 for the fully closed position of window 21 according to the invention. Preferably, metallic supporting member 41 is crimped over the top of fin member 40, and support member 41, fin 40, and strip 23 can be secured together by any convenient means such as staples, or mechanical fasteners, including the illustrated clip 26 for securing the assembly to structure 20 as described above.

The embodiment of FIG. 2 differs in another respect from the embodiment illustrated in FIG. 1 in that fabric strip 23 extends over the top of the device and down each of the opposed legs thereof, and plastic backing 24 extends across the entire back of strip 23 to form a single-piece unit and eliminate the need for fusing two parts together as described above for the embodiment of FIG. 1. The device illustrated in FIG. 2 can thus be formed in an original flat condition, coated with plastic backing 24, and then, by heat and pressure, formed into the illustraetd U-shape.

Other preferred embodiments of the invention are similar to those of FIGS. 1 and 2 as described above in that they include a resilient pile-bearing member urged against a window glass, and in that they are preferably formed of the same materials and in a similar manner to the embodiments described above. Only the differences and distinguishing features of these other embodiments will be discussed.

Figure 3:
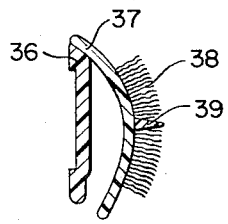

The embodiment of FIG. 3 shows an extruded plastic support element 36 similar to element 25 of FIG. 1, and plastic impregnated backing strip 37 bearing pile 38 is fused to support element 36 to form a unitary device. The distinguishing feature of the embodiment of FIG. 3 is a flexible fin 39 secured to backing strip 37 along with pile 38 to provide an improved seal against a window glass. Alternatively, the embodiment of FIG. 3 can be formed by extruding as a single, self-supporting unit, an element having the combined shape of elements 36 and 37 or a similar configuration. To such a unitary U-shaped extrusion, a pile 38 can be secured by any convenient means such as flocking, stitching, tufting, adhering, or fusing a pile or pile-bearing strip in place.

Figure 4:
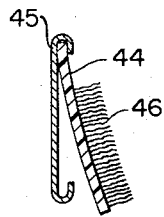

The embodiment of FIG. 4 has a plastic coated fabric backing element 44 of a different normal curvature, and one edge of backing element 44 is crimped in a metal support element 45. Pile 46 and backing element 44 are adapted to be deformed against support element 45 and bent over the lower edge of support element 45 by engagement with a window glass, molding, lifting mechanism, etc.

Figure 5:
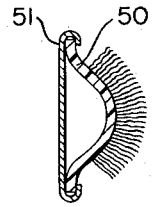

In the embodiment of FIG. 5, the backing strip 50 is bent into the illustrated curve, and its edges are secured under crimped portions of preferably metallic backing element 51. This embodiment is relatively stiff and less yielding.

Figure 6:
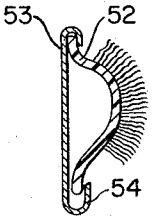

The embodiment of FIG. 6 is similar to the embodiment of FIG. 5 except that backing strip 52 is formed to assume the illustrated curvature normally, and the lower end of backing strip 52, instead of being crimped tightly in place under the lower edge of metallic plate 53, is movable therein. Thus, the upper end of backing strip 52 is crimped tightly in place under the upper edge of backing plate 53, and the lower end of backing strip 52 is allowed to move up and down under the up-turned lower edge 54 of backing plate 53. Up-turned edge 54 keeps backing strip 52 from slipping out of place, but allows free vertical movement of backing strip 52 in response to deformations caused by a window glass, molding, lifting mechanism, etc. The embodiment of FIG. 6 is preferred for compensating for changes in temperature causing differences in the lengths of backing strip 52, supporting plate 53, etc.

In the embodiment of FIG. 7, backing strip 71 is preferably pre-formed into the illustrated solid-line curvature in which pile 72 engages glass 21. Backing strip 71 is crimped under the upper edge of support element 73 and thereby held in place. Misalignment of glass 21, or passage of channel lifter 35 or a molding over pile 72 and backing strip 71 can deform backing strip 71 to the illustrated broken-line position, and beyond, without damage to the window engaging device. The resiliency of backing strip 71 is such that it will return to its illustrated solid-line position after having been deformed, so that pile 72 automatically remains in secure engagement with glass 21.

Figure 8:
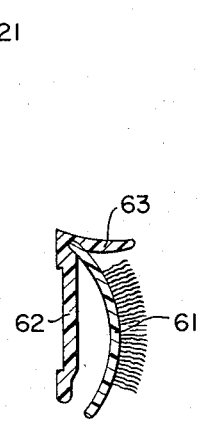

Backing element 61 of the embodiment of FIG. 8 is fused into union with a preferably extruded plastic support element 62 which is formed to provide an integral fin 63 for engaging the window glass to provide a more effective seal therewith. Fin 63 functions similarly to fin 40 illustrated in FIG. 2, and the embodiment of FIG. 8 is preferably adapted for disposition on the weather side of a window glass.

Figure 9:
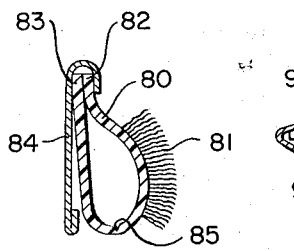

In the embodiment of FIG. 9, plastic coated fabric backing strip 80 bearing pile 81 is bent back upon itself so that its edges 82 and 83 are adjacent and in mutual alignment. Edges 82 and 83 are preferably crimped under backing strip 84 which is preferably formed of metal to secure the window engaging device in place. A score line 85 is preferably provided at the curved bottom portion of backing strip 80 to permit relatively sharp bending at that point and to adjust the resilience of the device.

Figure 10:
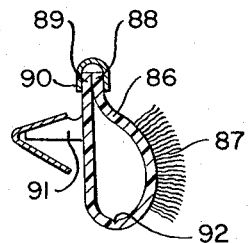

The embodiment of FIG. 10 is similar to that of FIG. 9, and plastic coated backing strip 86 with its pile 87 is bent upon itself to bring it opposite edges 88 and 89 into mutual alignment in a similar fashion. Edges 88 and 89 are crimped together by crimping strip 90, and a fastening clip 91 is secured directly to backing strip 86 to secure the element in place adjacent a window glass. Score line 92 can be provided for this embodiment if desired.

While the invention has been disclosed herein by reference to the details of a preferred embodiment, it is to be understood that such disclosure is intended in an illustrative, rather than a limiting, sense, and it is contemplated that various modifications of the combinations, construction and arrangement of the parts will readily occur to those skilled in the art, within the spirit of the invention and the scope of the appended claims.

I claim:

1. A device for mounting on a fixed member to engage a relatively movable window glass adjacent said member, said device comprising:
   (a) a relatively long and narrow material having a dense pile extending outward from one face thereof;
   (b) a lamina of resilient and long-flex-life thermoplastic resin secured to the back face of said material opposite said pile to form an integral, resilient strip;
   (c) said strip being curved in lateral cross section to dispose said pile in an outwardly convex relation to said window glass;
   (d) means communicating with one longitudinal edge of said strip for securing said strip to said member in spaced relation from said member and adjacent said window glass with said pile disposed to engage said window glass, and with the opposite longitudinal edge of said strip free for movement;
   (e) said lamina being thick enough and strong enough to support said strip resiliently in mounted position to allow resilient deformation of said strip by said window glass and repeated return of said strip from a deformed position to a normally assumed position; and
   (f) said free edge of said strip in mounted position being normally disposed near a fixed surface of said member for engaging said fixed surface upon deformation of said strip to brace said strip resiliently against further deformation.

2. The device of claim 1 wherein said securing means comprises a pile free lateral extension of said strip arranged behind said strip so that in cross section said strip and said extension form respective legs of a generally U-shape, and means for fastening said extension to said member so that said strip is spaced from said member by the width of said U-shape for free resilient motion.

3. The device of claim 1 including a long resilient fin arranged adjacent said strip and disposed on the weather side of said strip for engaging the outside of said window glass.

4. The device of claim 2 including a long resilient fin arranged adjacent said strip and disposed on the weather side of said strip for engaging the outside of said window glass.

References Cited

UNITED STATES PATENTS

| | | | |
|---|---|---|---|
| 1,475,916 | 11/1923 | Zanella | 49—489 X |
| 1,812,840 | 6/1931 | Michaels | 49—485 |
| 1,832,225 | 11/1931 | Levan | 49—485 X |
| 1,965,211 | 7/1934 | Axe | 49—482 |
| 2,004,722 | 6/1935 | Hamm | 49—485 X |
| 2,169,503 | 8/1935 | Schlegel | 49—492 X |
| 2,198,290 | 4/1940 | Place | 49—492 |
| 2,240,181 | 4/1941 | Fairbank | 49—490 X |
| 2,464,406 | 3/1949 | Kramer | 49—490 |
| 2,523,839 | 9/1950 | McKinney | 49—492 X |
| 2,568,811 | 9/1951 | Larsen | 49—485 |
| 2,756,468 | 8/1956 | Bright | 49—496 X |
| 2,913,783 | 11/1959 | Bright | 49—491 |
| 3,106,754 | 10/1963 | Grossman | 49—485 X |

DAVID J. WILLIAMOWSKY, *Primary Examiner.*

P. C. KANNAN, *Assistant Examiner.*